United States Patent [19]

Saito et al.

[11] 4,411,701

[45] * Oct. 25, 1983

[54] WATERPROOF GYPSUM MOLDED PRODUCT

[75] Inventors: Masumi Saito, Kobe; Eiichi Hirai, Takarazuka; Masao Endo, Nishinomiya, all of Japan

[73] Assignee: Kurashiki Bosiki Kabushiki Kaisha, Kurashiki, Japan

[*] Notice: The portion of the term of this patent subsequent to Jul. 27, 1997, has been disclaimed.

[21] Appl. No.: 344,171

[22] Filed: Jan. 29, 1982

Related U.S. Application Data

[63] Continuation-in-part of Ser. No. 191,824, Sep. 26, 1980, Pat. No. 4,341,560.

[30] Foreign Application Priority Data

Oct. 2, 1979 [JP] Japan .................. 54-127488

[51] Int. Cl.$^3$ ............................................. C04B 11/14
[52] U.S. Cl. ...................................... 106/87; 106/111
[58] Field of Search ................................... 106/87, 111

[56] References Cited

U.S. PATENT DOCUMENTS 4,040,850 8/1977 Kyri et al. ............................. 106/87
4,042,409 8/1977 Tereda et al. ........................ 106/111

FOREIGN PATENT DOCUMENTS 873805 7/1961 United Kingdom ................ 106/111
929375 6/1963 United Kingdom ................ 106/111

Primary Examiner—James Poer
Attorney, Agent, or Firm—Berman, Aisenberg & Platt

[57] ABSTRACT

The present invention provides a gypsum molded product having excellent waterproof properties without impaired strength by adding alkaline metal alkylsiliconates or phenylsiliconates together with calcium hydroxide or calcium oxide to gypsum; poly($\alpha,\beta$-unsaturated carboxylic acid) may be used in combination with the above, if desired. According to the present invention, the preparation of a gypsum molded product, particularly a gypsum from desulfurization of exhaust gas, is contemplated.

9 Claims, 1 Drawing Figure

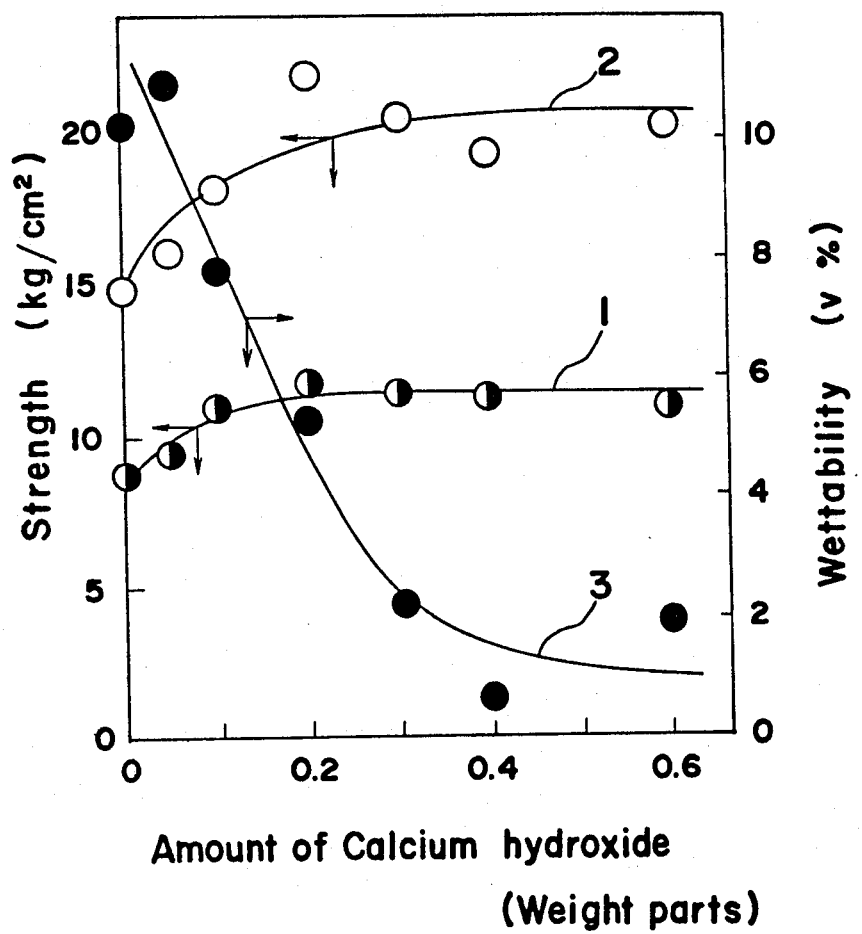

WATERPROOF GYPSUM MOLDED PRODUCT

This is a continuation-in-part application of our pending application Ser. No. 191,824, filed Sept. 26, 1980 now U.S. Pat. No. 4,341,560.

DETAILED DESCRIPTION OF INVENTION

The present invention relates to a waterproof gypsum molded product.

As gypsum molded products have excellent fire resistance and adiabatic properties as well as comparatively high strength, they are particularly useful as building materials. However, gypsum molded products can not be applied to a place exposed to rain and liable to be drenched and condensed, such as a roof, outside wall, bath room, kitchen and toilet, because of its poor waterproof properties; the product is merely applied to such places as ceiling, floor, inside wall and the like.

Recently, a large amount of gypsum was produced as a by-product in desulfurization of an exhaust gas and enlargement of effective use of the gypsum is required. For the sake of the noted enlargement, several processes have been proposed to impart waterproofness to gypsum molded products. For example, Japanese Patent Publication (unexamined) No. 136224/77 discloses combining an alkylsilicate compound with a slurry of a gypsum mixture as formed by adding an α-hemihydrate gypsum and/or II-type anhydrous gypsum to β-hemihydrate gypsum to make a hydrated product. Japanese Patent Publication No. 1224/78 shows mixing a gypsum or a gypsum composite with a water-soluble alkaline salt, such as a sodium or potassium salt, of silicone polymeric material. Japanese Patent Publication (unexamined) No. 33524/79 discloses using an aqueous solution of metal alkylsiliconate or phenylsiliconate for a building material containing gypsum as a principal component.

The aforementioned silicone compound imparts excellent waterproofness to concurrently decreases mechanical strength of gypsum molded products. Therefore, when the silicone compound is used as a water repellent or waterproofing agent, a sufficient improvement in waterproofness must be accompanied by a minimal decrease in mechanical strength. However, a sufficiently improved method had not been known.

Silikattechn. 13 (1962) Nr. 12 by K. Bergt discloses imparting waterproofness to gypsum products containing calcium oxide by the addition of potassium methylsiliconates. However, the calcium oxide content is too large to produce a molded waterproof gypsum product without spoiling mechanical strength, particularly in production of foamed molded waterproof products.

It has been found that addition of a calcium hydroxide or a calcium oxide to gypsum in combination with the silicone compound or an additional use of poly($\alpha$,$\beta$-unsaturated acid ester) emulsion solved the preceding problems.

The present invention relates to a waterproof gypsum molded product formed by a combination of hemihydrate gypsum, aqueous solution of alkaline metal alkylsiliconates or phenylsiliconates and a small amount of calcium hydroxide or calcium oxide as essential components, and also a waterproof gypsum molded product formed by a combination of hemihydrate gypsum, aqueous solution of alkaline metal alkylsiliconates or phenylsiliconates, poly($\alpha$,$\beta$-unsaturated carboxylic acid ester) emulsion and a small amount of calcium hydroxide or calcium oxide.

In the present invention, the gypsum may be preferably α- or β-hemihydrate gypsum as produced by calcining a gypsum selected from the group consisting of natural gypsum, chemical gypsum, and a gypsum from desulfurization of exhaust gas.

As alkaline metal alkylsiliconates or phenylsiliconates, there are sodium methylsiliconate, sodium ehtylsiliconate, sodium propylsiliconate, potassium methylsiliconate, potassium ethylsiliconate, potassium propylsiliconate, sodium phenylsiliconate, sodium benzylsiliconate, potassium phenylsiliconate, potassium benzylsiliconate. Such alkaline metal siliconates are used in aqueous solution form.

The amount of the aqueous solution of alkaline metal siliconates to be used is not critical, but it is preferably from 0.5 to 2 parts by weight based on 100 parts by weight of gypsum. The use more than 2 parts by weight is not economical and shows a tendency of decrease of the strength of the molded product.

Examples of the poly($\alpha$,$\beta$-unsaturated carboxylic acid ester), are poly(methyl acrylate), poly(ethyl arcylate), poly(butyl acrylate), poly(methyl methacrylate), poly(ethyl methacrylate), poly(butyl methacrylate), copolymer of acrylic acid or methacrylic acid with other monomers, and partially-hydrolized materials, which may be emulsified on or after of polymerization. Particularly an emulsion of after polymer having excellent alkaline resistance and the lowest film-forming temperature (less than 45° C.) is preferable.

An emulsion of poly($\alpha$,$\beta$-unsaturated carboxylic acid) imparts weathering stability, alkaline resistance, water repellency, waterproofness and the like to a gypsum molded product. Furthermore, in case of foamed materials, said emulsion not only prevents powdering or whitening on the surface of the foamed materials but also stabilizes.

The preferred amount of poly($\alpha$,$\beta$-unsaturated carboxylic acid ester) emulsion is from 5 to 20 parts by weight based on 100 parts by weight of gypsum.

In the present invention, the calcium hydroxide or the calcium oxide is used in about 0.07 to about 3.5 parts by weight (as CaO), particularly more than about 0.14 to about 3.0 parts by weight (as CaO), based on 100 parts by weight of gypsum.

Use of the calcium oxide or calcium hydroxide in more than about 3.5 parts by weight (as CaO) lowers waterproof ability of the molded product, and use of large excess of it, for instance, about more than 10 or 20 parts by weight, lowers mechanical strength. Particularly, a foamed molded product produced from a gypsum composition containing the large excess of calcium oxide or calcium hydroxide is very apt to crack.

The noted essential components are blended with a suitable amount of water, such as from 30 to 80 parts by weight based on 100 parts by weight of gypsum, to make a slurry and then cast, molded and dried to give a waterproof gypsum molded product.

The gypsum molded product of the present invention may be lightened in accordance with the purpose. A method of lightening is not critical, but a foaming method comprising generation of gases in the slurry during solidification is preferable, because such method yields a uniform lightweight molded product. The lightweight gypsum molded product may be produced by foaming slurry in the presence of hydrogen peroxide and degradation catalyst. The amount of hydrogen peroxide used as a foaming agent may be varied according to the required density of the molded product. In general, it is preferable to use 0.4 to 2.0 parts by weight of hydrogen peroxide (35% by weight) based on 100 parts by weight of the gypsum.

The degradation catalyst for hydrogen peroxide as used in the present invention, is preferably selected from cobalt compounds, such as cobalt sulfate, cobalt nitrate, cobalt chloride and the like, considering activity of the catalyst, condition of foaming, density of foamed molded product, slurry setting time and the like. Of course, the catalyst is not restricted to a cobalt salt. If desired, an agent to control the pot life of the slurry, such as citric acid and potassium sulfate, may be combined.

According to the present invention, the problem that the aforementioned silicone compound (having an excellent ability as a water repellent or a waterproofing agent) weakens a gypsum molded product can be solved.

That is, the gypsum molded product according to the present invention has excellent waterproofness and mechanical strength and thus is useful for various applications, particularly as building material.

The present invention enlarges the application of gypsum and contributes to effective use of gypsum which is produced in large amount as a by-product in desulfurization of exhaust gas, which is widely employed for preventing pollution.

The invention will be described further in conjugation with examples showing the practice of the present invention. These examples, however, are not to be construed as limiting the invention to their details.

EXAMPLE 1

Seven kinds of molded product (including two comparatives) are prepared according to the formulations as shown in Table 1 (molded products A and B are comparative products).

TABLE 1

| components | amount parts by weight No. of molded product | | | | | comparatives | |
|---|---|---|---|---|---|---|---|
| | 1 | 2 | 3 | 4 | 5 | A | B |
| water | 50 | 50 | 50 | 50 | 60 | 50 | 50 |
| citric acid | 0.02 | 0.02 | 0.02 | 0.02 | 0.02 | 0.02 | 0.02 |
| calcium hydroxide (converted to CaO) | 0.1 (0.07) | 0.2 (0.14) | 0.3 (0.21) | 0.4 (0.28) | 0.6 (0.42) | — | 0.05 (0.04) |
| potassium methylsiliconate (50 weight % solid) | 1 | 1 | 1 | 1 | 1 | 1 | 1 |
| emulsion of poly(ethyl acrylate) (45 weight % solid) | 10 | 10 | 10 | 10 | 10 | 10 | 10 |
| hemihydrate gypsum | 100 | 100 | 100 | 100 | 100 | 100 | 100 |
| 6% by weight of hydrogen peroxide | 6 | 6 | 6 | 6 | 6 | 6 | 6 |
| cobalt (II) sulfate | 0.05 | 0.05 | 0.05 | 0.05 | 0.05 | 0.05 | 0.05 |

Water, citric acid, calcium hydroxide, potassium alkylsiliconate, emulsion of poly(acrylic acid ester), hemihydrate gypsum and cobalt (II) sulfate are mixed with stirring to prepare gypsum slurries. After the hydrogen peroxide (6% by weight) is added to the resultant slurry with sufficient stirring, the mixtures are cast into molds (4 cm×4 cm×16 cm) and removed from the molds after one hour. The molded products are permitted to stand at 50° C. for 24 hours to prepare gypsum molded products.

The physical properties of the gypsum molded products are shown in Table 2.

TABLE 2

| physical properties | molded product | | | | | comparatives | |
|---|---|---|---|---|---|---|---|
| | 1 | 2 | 3 | 4 | 5 | A | B |
| specific gravity ($\rho$) | 0.48 | 0.47 | 0.51 | 0.54 | 0.64 | 0.47 | 0.52 |
| bending strength ($F_{0.5}$) (Kg/cm$^2$)[1] | 10.9 | 11.7 | 11.3 | 11.3 | 11.0 | 8.7 | 9.4 |
| compressive strength ($F'_{0.5}$) (Kg/cm$^2$)[2] | 18.3 | 22.1 | 20.7 | 19.3 | 20.4 | 14.9 | 16.2 |
| wettability (V %)[3] | 7.8 | 5.3 | 2.2 | 0.7 | 1.9 | 10.2 | 10.9 |

[1]The bending strength ($F_{0.5}$) is a calculated value according to formula:
$$F_{0.5} = F(0.5/\rho)^{2.2},$$
wherein $F_{0.5}$ is a calculated bending strength of the molded product, assuming its specific gravity is 0.5; F is an observed bending strength of the molded product having a specific gravity of $\rho$; $\rho$ is an observed specific gravity of the molded product.
[2]The compressive strength $F'_{0.5}$ is a calculated value according to formula:
$$F'_{0.5} = F'(0.5/\rho)^{2.5},$$
wherein $F'_{0.5}$ is a calculated compressive strength of the molded product, assuming its specific gravity is 0.5; F' is an observed compressive strength of the molded product having a specific gravity of $\rho$, and $\rho$ is an observed specific gravity of the molded product.
[3]The wettability is calculated by the formula:
$$\text{wettability} = \frac{\text{weight of molded product (g) after soaking into water [A]} - \text{weight of dry molded product (g)}}{\text{volume of molded product (cm}^3\text{)}} \times 100$$
wherein [A] is determined by soaking the molded product into a streaming water having a flow rate of about 150 ml/min. for 24 hours in the manner that the upper surface of the molded product is in 2 cm below the stream surface.

The relation between bending strength, the compressive strength and the wettability in Table 1 and the amount of calcium hydroxide to be used in Table 2 is illustrated in Figure, wherein the figure of drawing which shows the relationship between the amount of calcium hydroxide (abscissa) and the bending strength, the compressive strength and the wettability by (1), (2) and (3), respectively (the strength is expressed by the left longitudinal axis and the wettability is expressed by the right axis).

EXAMPLE 2

Four kinds of molded product are prepared according to formulations of Table 3 (molded products C and D are comparative products).

TABLE 3

| | amount parts by weight molded products | | | |
|---|---|---|---|---|
| | | | comparatives | |
| components | 6 | 7 | C | D |
| water | 54.5 | 44 | 55 | 54.5 |
| citric acid | 0.04 | 0.02 | 0.04 | 0.04 |
| calcium hydroxide (converted to CaO) | 0.2 (0.14) | 0.2 (0.14) | 0 | 0 |
| potassium methylsiliconate (50 weight % solid) | 1 | 1 | 0 | 1 |
| emulsion of poly(ethyl acrylate) (45 weight % solid) | 0 | 10 | 0 | 0 |
| hemihydrate gypsum | 100 | 100 | 100 | 100 |

The components in Table 3 are mixed with stirring to give gypsum slurries. The slurries are cast into molds (4 cm×4 cm×16 cm) and removed after one hour. Standing for one day and night at room temperature, the products are dried for 24 hours at 50° C. to give gypsum molded products, the physical properties of which are shown in Table 4.

TABLE 4

| | molded products | | | |
|---|---|---|---|---|
| | | | comparatives | |
| physical properties | 6 | 7 | C | D |
| bending strength (Kg/cm²)[1] | 87.0 | 90.1 | 90.5 | 86.7 |
| wettabilities (V %)[2] | 1.7 | 0.5 | 20.6 | 5.3 |

[1] and [2] are determined by the same manner as described in Example 1.

EXAMPLE 3

This Example indicates the relation between the amount of calcium oxide and waterproofness and mechanical strength of foamed molded products.

Seven kinds of molded product are prepared according to the formulation as shown in Table 5 (molded products E, F and G are comparatives; E does not include potassium methyl siliconate).

Preparation of these gypsum products and the physical properties of the products are determined according to Example 1. The results are shown in Table 5.

TABLE 5

| | 8 | 9 | 10 | 11 | comparatives | | |
|---|---|---|---|---|---|---|---|
| | | | | | E | F | G |
| Water | 58 | 58 | 58 | 58 | 58 | 58 | 58 |
| CaSO₄.2H₂O | 0.2 | 0.2 | 0.1 | 0.1 | 0.2 | 0.1 | 0.1 |
| potassium methylsiliconate (a) (50 wt % aqueous solution) | 1 | 1 | 1 | 1 | 0 | 1 | 1 |
| emulsion of poly(ethyl acrylate) (45 wt % solid) | 10 | 10 | 10 | 10 | 10 | 10 | 10 |
| hemihydrate gypsum | 100 | 100 | 100 | 100 | 100 | 100 | 100 |
| calcium hydroxide | 0 | 0 | 0 | 0 | 0.2 | 0 | 0 |
| calcium oxide | 0.2 | 0.5 | 1 | 2 | 0 | 5 | 10 |
| 6% H₂O₂ | 6 | 6 | 6 | 6 | 5 | 6 | 6 |
| cobalt (II) sulfate | 0.06 | 0.06 | 0.15 | 0.4 | 0.04 | 0.5 | 0.75 |
| strengthening additive content (converted to CaO) (b) | 0.2 | 0.5 | 1 | 2 | 0.15 | 5 | 10 |
| (b)/(a) | 0.4 | 1 | 2 | 4 | 0 | 10 | 20 |
| specific gravity (ρ) | 0.50 | 0.54 | 0.53 | 0.55 | 0.51 | 0.57 | 0.63 |
| bending strength (F₀.₅) (Kg/cm²) | 10.8 | 10.5 | 9.1 | 9.4 | 11.2 | 8.1 | 6.8 |
| compressive strength (F'₀.₅) (Kg/cm²) | 20.3 | 19.4 | 17.8 | 17.1 | 20.3 | 15.9 | 13.3 |
| wettability (V %) | | | | | | | |
| after 1 hour | 0.9 | 1.0 | 0.6 | 0.8 | 33.9 | 27.6 | 37.1 |
| after 3 hours | 1.2 | 1.4 | 1.1 | 1.5 | 34.1 | 35.1 | 37.2 |
| after 24 hours | 4.2 | 5.2 | 5.1 | 24.7 | 34.1 | 35.5 | 37.2 |

EXAMPLE 4

This Example illustrates the relation between the amount of calcium hydroxide and waterproofness and mechanical strength of foamed molded products.

Eight kinds of molded product are prepared according to the formulations as shown in Table 6 (molded products H, I, J and K are comparative molded products; E which is prepared in Example 3 is listed in this Table as a reference).

Preparation of these gypsum products and the physical properties of the products are determined according to Example 1. The results are shown in Table 6.

TABLE 6

| | 12 | 13 | 14 | 15 | comparatives | | | | |
|---|---|---|---|---|---|---|---|---|---|
| | | | | | E | H | I | J | K |
| water | 55 | 55 | 55 | 55 | 58 | 55 | 60 | 60 | 70 |
| CaSO₄.2H₂O | 0.15 | 0.15 | 0.15 | 0.15 | 0.2 | 0.15 | 0.15 | 0.15 | 0.15 |
| potassium methylsiliconate (a) (50 wt % aqueous solution) | 1 | 1 | 1 | 1 | 0 | 1 | 1 | 1 | 1 |
| emulsion of poly(ethyl acrylate) (45 wt % solid) | 10 | 10 | 10 | 10 | 10 | 10 | 10 | 10 | 10 |
| hemihydrate gypsum | 100 | 100 | 100 | 100 | 100 | 100 | 100 | 100 | 100 |
| calcium hydroxide | 0.2 | 0.5 | 1 | 2 | 0.2 | 0 | 5 | 10 | 25 |
| calcium oxide | 0 | 0 | 0 | 0 | 0 | 0 | 0 | 0 | 0 |
| 6% H₂O₂ | 6 | 6 | 6 | 6 | 5 | 6 | 6 | 6 | 6 |
| cobalt (II) sulfate | 0.06 | 0.1 | 0.2 | 0.4 | 0.04 | 0.06 | 0.5 | 0.75 | 1.0 |

TABLE 6-continued

|  | 12 | 13 | 14 | 15 | comparatives | | | | |
|---|---|---|---|---|---|---|---|---|---|
|  |  |  |  |  | E | H | I | J | K |
| strengthening additive content (converted to CaO) (b) | 0.15 | 0.38 | 0.76 | 1.51 | 0.15 | 0 | 3.79 | 7.57 | 18.93 |
| (b)/(a) | 0.3 | 0.8 | 1.5 | 3.0 | 0 | 0 | 7.6 | 15.1 | 37.9 |
| specific gravity ($p$) | 0.53 | 0.55 | 0.55 | 0.59 | 0.51 | 0.49 | 0.60 | 0.58 | 0.62 |
| bending strength ($F_{0.5}$) (Kg/cm$^2$) | 10.1 | 10.8 | 9.6 | 9.8 | 11.2 | 9.3 | 8.5 | 7.1 | 6.6 |
| compressive strength ($F'_{0.5}$) (Kg/cm$^2$) | 19.2 | 20.6 | 17.5 | 18.1 | 20.3 | 15.9 | 16.2 | 14.5 | 12.9 |
| wettability (V %) |  |  |  |  |  |  |  |  |  |
| after 1 hour | 0.7 | 0.5 | 0.9 | 1.3 | 33.9 | 1.3 | 34.1 | 36.9 | 39.5 |
| after 3 hours | 2.2 | 1.2 | 2.3 | 3.4 | 34.1 | 7.2 | 37.2 | 37 | 39.5 |
| after 24 hours | 8.1 | 3.1 | 4.0 | 10.2 | 34.1 | 11.9 | 39.3 | 37.2 | 39.7 |

EXAMPLE 5

Eight kinds of molded product are prepared according to Example 4 provided that potassium methylsiliconate is used in 2 parts by weight (1 part by weight as solid) per 100 parts by weight gypsum (molded products L, M, N and P are comparatives). Formulations and physical properties of the products are shown in Table 7.

Example 6 (non-foamed molded gypsum products)

All components indicated in each column of Table 8 are mixed together and the mixtures are cast into molds (4 cm×4 cm×16 cm) and removed from the molds after one hour. The molded products are permitted to stand at 50° C. for 24 hours to give ten kinds of non-foamed gypsum molded product including five comparatives (Product Nos. Q, R, S, T and U).

The physical properties of the gypsum molded products are determined and the results are shown in Table 8.

TABLE 7

|  | 16 | 17 | 18 | 19 | 20 | comparatives | | | |
|---|---|---|---|---|---|---|---|---|---|
|  |  |  |  |  |  | L | M | N | P |
| water | 55 | 55 | 55 | 55 | 55 | 55 | 58 | 60 | 70 |
| CaSO$_4$.2H$_2$O | 0.15 | 0.15 | 0.15 | 0.15 | 0.15 | 0.15 | 0.1 | 0.1 | 0.1 |
| potassium methylsiliconate (a) (50 wt % aqueous solution) | 2 | 2 | 2 | 2 | 2 | 2 | 2 | 2 | 2 |
| emulsion of poly(ethyl acrylate) (45 wt % solid) | 10 | 10 | 10 | 10 | 10 | 10 | 10 | 10 | 10 |
| hemihydrate gypsum | 100 | 100 | 100 | 100 | 100 | 100 | 100 | 100 | 100 |
| calcium hydroxide | 0.2 | 0.5 | 1 | 2 | 4 | 0 | 5 | 10 | 25 |
| calcium oxide | 0 | 0 | 0 | 0 | 0 | 0 | 0 | 0 | 0 |
| 6% H$_2$O$_2$ | 6 | 6 | 6 | 6 | 6 | 5 | 6 | 6 | 6 |
| cobalt (II) sulfate | 0.06 | 0.1 | 0.2 | 0.4 | 0.5 | 0.04 | 0.5 | 0.75 | 1.0 |
| strengthening additive content (converted to CaO) (b) | 0.15 | 0.38 | 0.76 | 1.51 | 3.02 | 0 | 3.79 | 7.57 | 18.93 |
| (b)/(a) | 0.15 | 0.4 | 0.8 | 1.5 | 3.0 | 0 | 3.8 | 7.6 | 18.9 |
| specific gravity ($p$) | 0.48 | 0.50 | 0.53 | 0.56 | 0.59 | 0.51 | 0.58 | 0.63 | 0.63 |
| bending strength ($F_{0.5}$) (Kg/cm$^2$) | 8.8 | 9.4 | 10.2 | 10.3 | 9.7 | 8.4 | 9.6 | 9.5 | 7.9 |
| compressive strength ($F'_{0.5}$) (Kg/cm$^2$) | 15.5 | 18.2 | 20.1 | 19.8 | 18.8 | 14.7 | 18.1 | 17.2 | 13.5 |
| wettability (V %) |  |  |  |  |  |  |  |  |  |
| after 1 hour | 1.2 | 1.1 | 0.8 | 1.1 | 1.4 | 1.5 | 8.1 | 37.7 | 40 |
| after 3 hours | 2.7 | 3.1 | 1.1 | 1.9 | 4.8 | 3.3 | 36.3 | 38.9 | 40.2 |
| after 24 hours | 5.9 | 5.7 | 3.3 | 7.6 | 22.8 | 8.1 | 39.6 | 40.1 | 40.8 |

TABLE 8

|  | 21 | 22 | 23 | 24 | 25 | comparatives | | | | |
|---|---|---|---|---|---|---|---|---|---|---|
|  |  |  |  |  |  | Q | R | S | T | U |
| water | 55 | 55 | 55 | 55 | 58 | 55 | 55 | 60 | 55 | 60 |
| potassium methylsiliconate (a) (50 wt % aqueous solution) | 1 | 1 | 2 | 2 | 2 | 0 | 1 | 1 | 2 | 2 |
| emulsion of poly(ethyl acrylate) (45 wt % solid) | 10 | 10 | 10 | 10 | 10 | 10 | 10 | 10 | 10 | 10 |
| hemihydrate gypsum | 100 | 100 | 100 | 100 | 100 | 100 | 100 | 100 | 100 | 100 |
| calcium hydroxide | 0.5 | 2 | 1 | 2 | 4 | 0 | 0 | 5 | 0 | 5 |
| CaSO$_4$.2H$_2$O | 0.15 | 0.15 | 0.15 | 0.15 | 0.1 | 0.2 | 0.15 | 0.15 | 0.15 | 0.1 |
| strengthening additive content (converted to CaO) (b) | 0.38 | 1.51 | 0.76 | 1.51 | 3.02 | 0 | 0 | 3.79 | 0 | 3.79 |
| (b)/(a) | 0.8 | 3.0 | 0.8 | 1.5 | 3.0 | 0 | 0 | 7.6 | 0 | 3.8 |
| specific gravity ($p$) | 1.16 | 1.19 | 1.19 | 1.17 | 1.17 | 1.18 | 1.15 | 1.13 | 1.18 | 1.17 |
| bending strength (F)[4] (Kg/cm$^2$) | 82.4 | 74.3 | 78.6 | 79.2 | 71.4 | 85.1 | 73.7 | 65.1 | 64.7 | 69.5 |
| wettability (V %) |  |  |  |  |  |  |  |  |  |  |
| after 1 hour | 0.8 | 2.7 | 0.8 | 0.9 | 1.9 | 25.9 | 3.1 | 29.8 | 1.5 | 13.2 |
| after 3 hours | 1.7 | 6.1 | 1.3 | 2.1 | 15.6 | 27.9 | 8.5 | 34.6 | 3.8 | 39.6 |

TABLE 8-continued

|  | 21 | 22 | 23 | 24 | 25 | comparatives | | | | |
|---|---|---|---|---|---|---|---|---|---|---|
|  |  |  |  |  |  | Q | R | S | T | U |
| after 24 hours | 5.1 | 18.5 | 4.1 | 6.4 | 36.1 | 30.6 | 12.9 | 37.9 | 9.1 | 40.8 |

[4]Bending strength of the molded product itself.

BRIEF DESCRIPTION OF THE DRAWING

FIG. 1 shows an effect obtained by the addition of calcium hydroxide to the bending strength (1), the compressive strength (2) and the wettability (3) of the molded foamed gypsum product of the present invention.

What is claimed is:

1. A molded waterproof gypsum product formed of a mixture of hemihydrate gypsum with 0.25 to 1 part by weight of an alkali metal alkylsiliconate or phenylsiliconate and 0.07 to 3.5 parts by weight (as CaO) of a strengthening additive selected from calcium oxide and calcium hydroxide per 100 parts by weight of gypsum.

2. A product according to claim 1 in which the alkylsiliconate or phenylsiliconate is one selected from sodium methylsiliconate, sodium ethylsiliconate, sodium propylsiliconate, potassium methylsiliconate, sodium phenylsiliconate, sodium benzylsiliconate, potassium phenylsiliconate, and potassium benzylsiliconate.

3. A product according to claim 1 in which the product is produced from a mixture containing 0.1 to 2 parts by weight (as CaO) of the strenghtening additive per 100 parts by weight of hemihydrate gypsum.

4. A molded waterproof gypsum product formed of a mixture of hemihydrate gypsum with 0.25 to 1 part by weight of an alkali metal alkylsiliconate or phenylsiliconate, 0.07 to 3.5 parts by weight (as CaO) of a strengthening additive selected from calcium oxide and calcium hydroxide and 2.5 to 10 parts by weight of a poly($\alpha,\beta$-unsaturated carboxylic acid ester) per 100 parts by weight of hemihydrate gypsum.

5. A product according to claim 4 in which the alklsiliconate or phenylsiliconate is one selected from sodium methylsiliconate, sodium ethylsiliconate, sodium propylsiliconate, potassium methylsiliconate, sodium phenylsiliconate, sodium benzylsiliconate, potassium phenylsiliconate and potassium benzylsiliconate.

6. A product according to claim 4 in which the product is produced from the mixture containing 0.1 to 2 parts by weight (as CaO) of the strengthening additive per 100 parts by weight of hemihydrate gypsum.

7. A product according to claim 4 in which the poly($\alpha,\beta$-unsaturated carboxylic acid ester) is one selected from poly(methyl acrylate, poly(ethyl acrylate), poly(methyl methacrylate), poly(ethyl methacrylate), and copolymer containing acrylic acid ester and/or methacrylic acid ester moiety.

8. A product according to claim 4 that is a lightweight foamed product.

9. A product according to claim 4 made by molding an aqueous slurry of the mixture, in which the alkali metal alkylsiliconate or phenylsiliconate is introduced as an aqueous solution and the poly($\alpha,\beta$-unsaturated carboxylic acid ester) is introduced as an emulsion.

* * * * *

UNITED STATES PATENT AND TRADEMARK OFFICE
CERTIFICATE OF CORRECTION

PATENT NO. : 4,411,701

DATED : October 25, 1983

INVENTOR(S) : Masumi SAITO, Eiichi HIRAI and Masao ENDO

It is certified that error appears in the above-identified patent and that said Letters Patent are hereby corrected as shown below:

Title page, column 1, item [*], "July 27, 1997" should read --July 27, 1999--.

Signed and Sealed this

Seventh Day of February 1984

[SEAL]

Attest:

GERALD J. MOSSINGHOFF

Attesting Officer

Commissioner of Patents and Trademarks